United States Patent
Case et al.

[15] 3,685,012
[45] Aug. 15, 1972

[54] APPARATUS FOR DETERMINING DATA ASSOCIATED WITH OBJECTS

[72] Inventors: John S. Case, Hauppauge; Edwin W. Whitfield, Great Neck, both of N.Y.

[73] Assignee: Sperry Rand Corporation

[22] Filed: April 16, 1970

[21] Appl. No.: 29,189

[52] U.S. Cl............340/38 P, 250/222 R, 178/DIG. 1
[51] Int. Cl..............................................G08g 1/01
[58] Field of Search .340/38 P; 178/DIG. 1; 250/222, 250/224

[56] References Cited

UNITED STATES PATENTS

| | | | |
|---|---|---|---|
| 3,222,979 | 12/1955 | Webster | 178/DIG. 1 |
| 3,488,510 | 1/1970 | Raymond et al. | 250/222 R |
| 3,532,886 | 10/1970 | Kruger et al. | 340/38 P X |

*Primary Examiner*—William C. Cooper
*Attorney*—S. C. Yeaton

[57] ABSTRACT

Apparatus for determining data associated with objects such as vehicular traffic on a roadway. An alternating pattern comprising colinearly arranged contrasting portions adjacent each other is disposed on the surface of the roadway. A television camera is disposed above the roadway for scanning the traffic on the roadway as well as the pattern which may be partially obscured by the vehicles. The video pulses resulting from scanning the pattern are processed to determine the data associated with the vehicles.

27 Claims, 5 Drawing Figures

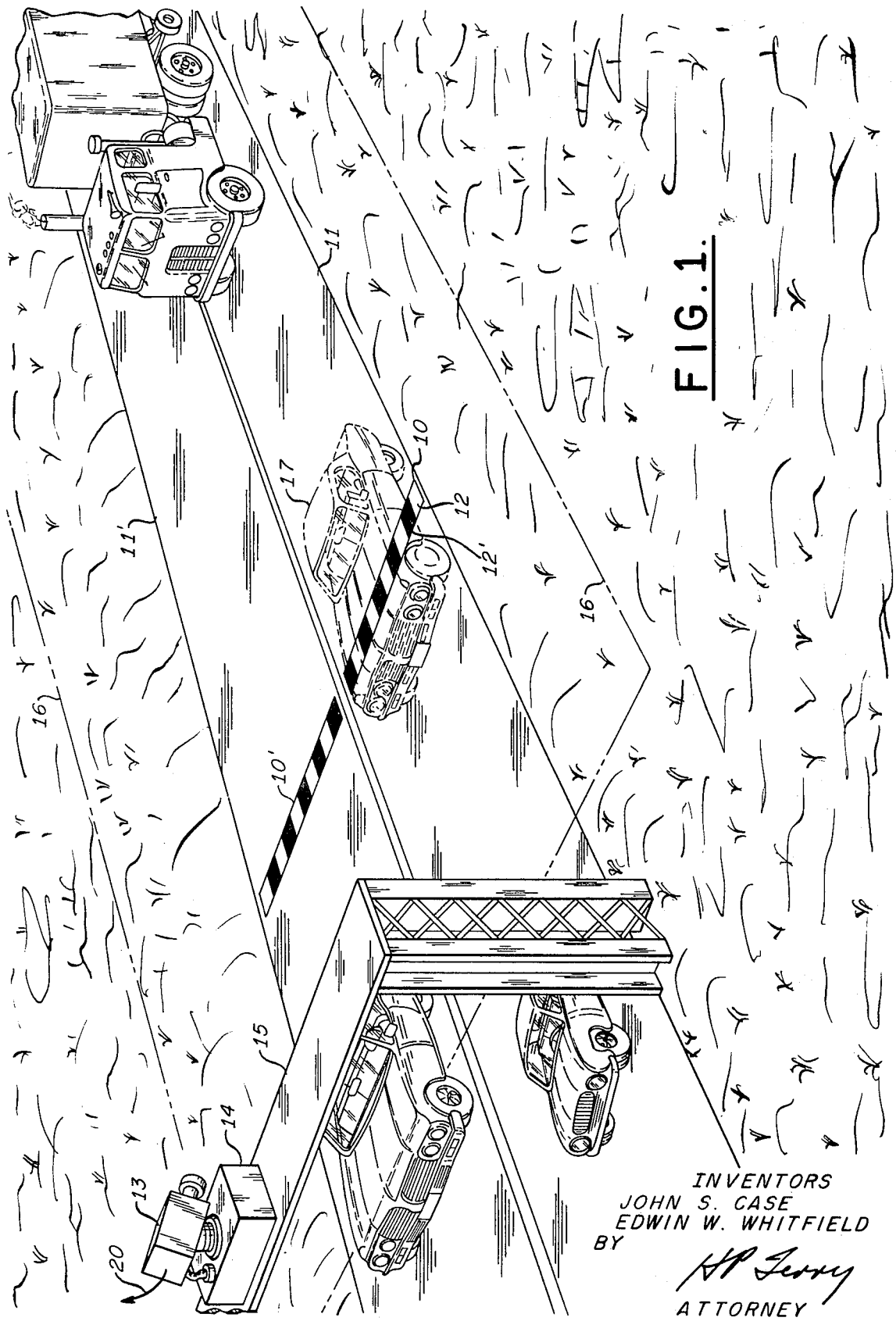

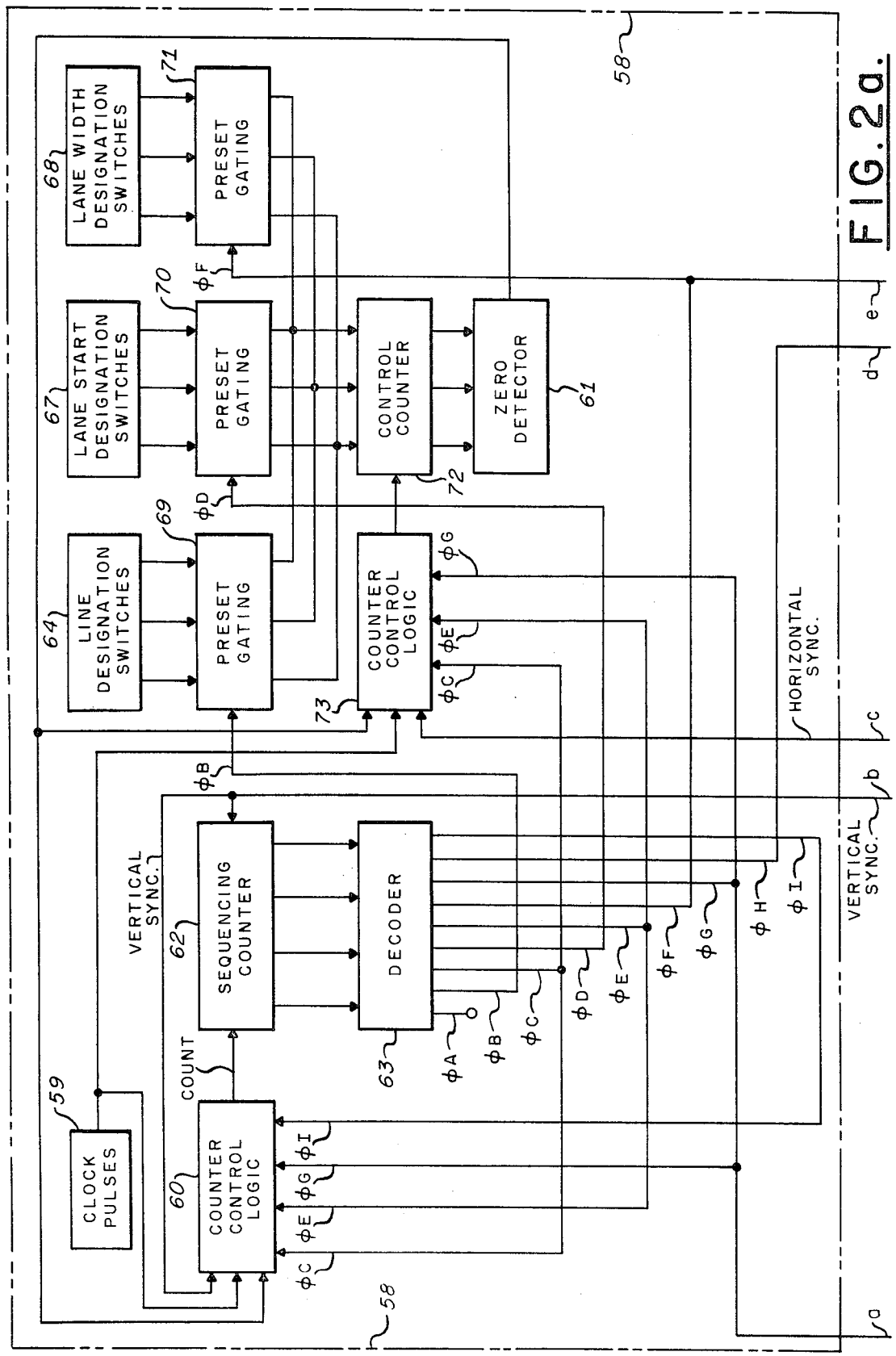

INVENTORS
JOHN S. CASE
EDWIN W. WHITFIELD
BY
ATTORNEY

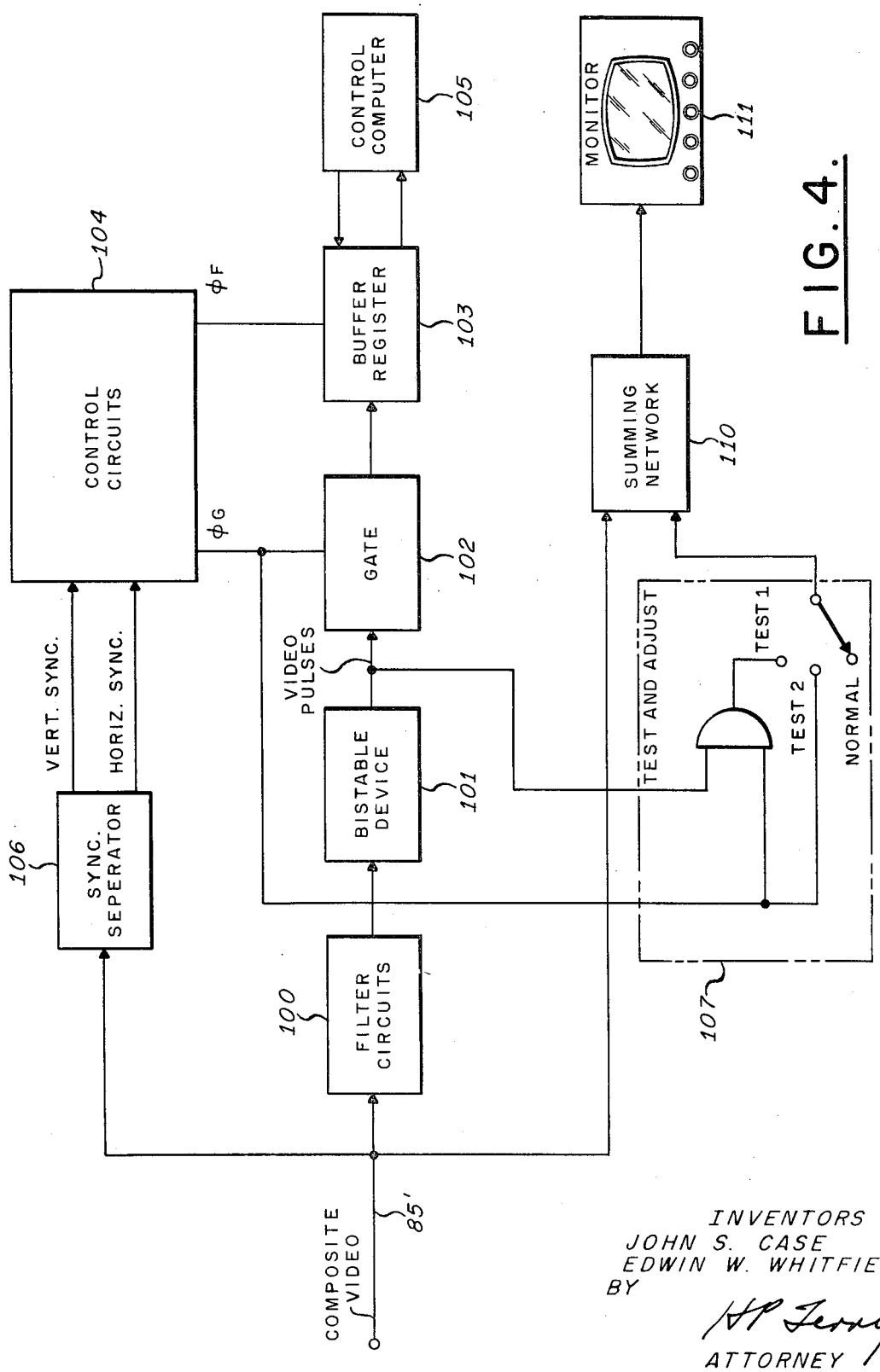

APPARATUS FOR DETERMINING DATA ASSOCIATED WITH OBJECTS

BACKGROUND OF THE INVENTION

1. Field of the Invention

The present invention is concerned with data sensors particularly of the type for determining data associated with vehicular traffic.

2. Description of the Prior Art

Vehicular traffic control systems are known that utilize digital control computers to effectuate the regulation of traffic by selective control of the traffic signal lights. Such systems are often traffic actuated, that is, the flow of traffic is sensed and the data derived thereby is utilized for the efficacious control of the traffic.

Prior art vehicle sensors of the types used in such systems often suffer from the disadvantage that a particular type of sensor is limited to determining only one type of data. For example, magnetic loop detectors, pneumatic treadle switches and sonic sensors are utilized to detect the presence of vehicles whereas radar sensors may be used to detect vehicle velocity. Hence for locations at which diverse types of data are required, several different types of sensors may be necessary. Additionally, parameters such as vehicle count, lane occupancy, queue length, vehicle length or width and lane crossings may be inconvenient or difficult to obtain.

In addition to the disadvantage of limited function, the detection zones for prior art sensors are often imprecisely defined. Currently available sensors further suffer from the disadvantages of providing data of limited accuracy and at low data rates. Thus prior art sensors are presently incapable of providing highly accurate data to the control system over a finely resolved and well-defined area of traffic flow at rapidly recurring time intervals. Hence the accuracy and data rate requirements of complex and sophisticated traffic control systems of currently developed types utilizing digit control computers may not be satisfied by the prior art sensors.

In addition, prior art vehicle sensors may be susceptible to high error rates due to generation of false data under certain circumstances. For example, magnetic loop detectors often provide false indications of vehicle presence during electrical storms.

Another limitation of the prior art sensors is that the continuous proper operation thereof is not conveniently verified from the central site of a traffic control system. The accuracy, for example, of the data provided by the sensors may decrease without any indication being provided of the diminished performance capability.

Additionally, the signals provided by prior art sensors are often not in a form suitable for input to the central digital control computer of the system thus necessitating undesirable signal conversions.

Prior art vehicular traffic control systems often utilize closed-circuit television surveillance cameras at various intersections and locations along roadways, the corresponding television monitors being located at the central control site of the system. These cameras and monitors are conventionally utilized for visual monitoring of the traffic situation at locations throughout the zone under control of the system.

SUMMARY OF THE INVENTION

The present invention recognizes that the visual images of the traffic situation provided by the television surveillance camera and displayed on the associated monitors contain all of the data required to provide traffic regulation in a modern traffic control system. For example, the count of the vehicles traversing a section of roadway under surveillance may readily be obtained by an observer viewing the monitor. In a similar manner, the parameters such as vehicle presence, vehicle velocity, lane occupancy, queue length, vehicle length or width and lane crossings may be obtained by simple observations or measurement procedures. In addition, the television surveillance system provides this data over a finely resolved and well-defined field of view and at the rapid frame rate provided by modern television equipment. Conventionally, the frame rate may be 60 frames per second. Thus the television image contains data pertinent to an extensive number of traffic parameters, which data is finely resolvent with respect to the field of view and to time. Although this data may be extracted by visual methods, the data would not be in a form suitable for use in an automatic traffic control system utilizing a digital computer.

It was further recognized that the data contained in the television image was inherently included in the signal provided by the television camera.

It is therefore an object of the present invention to provide a system for automatically extracting the traffic data from the video signal in a form suitable for use in a modern traffic control system.

The aforementioned object of the invention is achieved by a system in which an alternating pattern comprising collinearly arranged contrasting portions adjacent each other is disposed on the surface of the roadway. The television camera is disposed above the roadway for scanning the traffic on the roadway as well as the pattern which may be partially obscured by the vehicles. The video pulses resulting from scanning the pattern are processed to determine the data associated with the vehicles.

It will be appreciated that the principles of the present invention are applicable to determining data associated with objects other than vehicles by scanning means other than television cameras.

BRIEF DESCRIPTION OF THE DRAWINGS

FIG. 1 is a perspective view of a portion of a roadway adapted for utilizing an embodiment of the present invention.

FIGS. 2a and 2b are is a block schematic diagram of a circuit utilized in the embodiment of FIG. 1.

FIG. 4 is a block schematic diagram of a circuit utilized in the embodiment of FIG. 3.

DESCRIPTION OF THE PREFERRED EMBODIMENTS

Figure 2B:
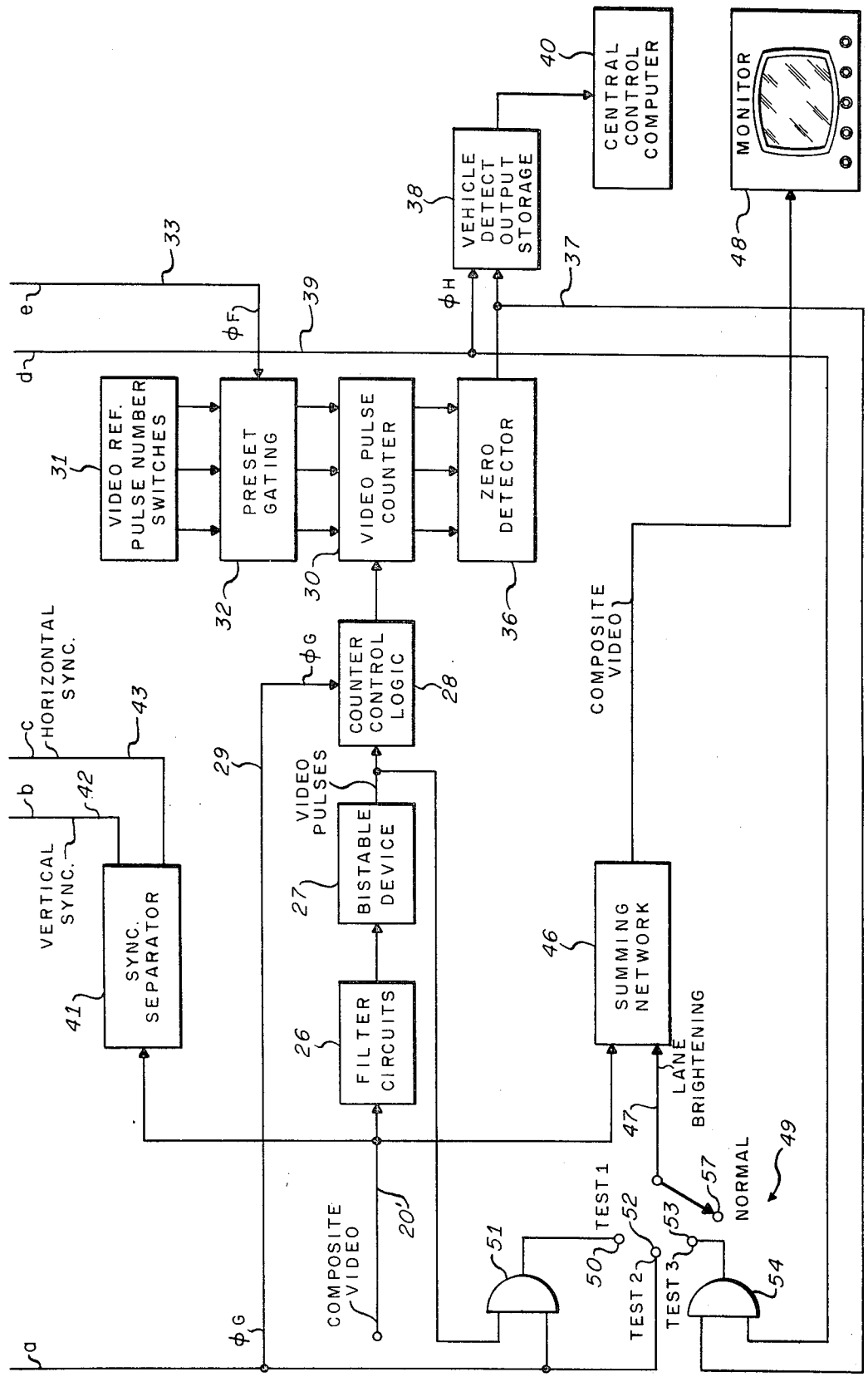

Referring to FIG. 1, a portion of two lanes of a roadway adapted for utilizing an embodiment of the present invention is illustrated.

An alternating pattern 10 is disposed on the surface of a lane 11 of the roadway transversely thereto. The pattern 10 may comprise collinearly arranged contrasting portions 12 and 12'. The portions 12 may comprise rectangularly shaped sections having white surfaces and the portions 12' may comprise rectangularly shaped sections having black surfaces. The portions 12 and 12' are alternately arranged and contiguous with respect to each other.

A television camera 13 with an associated sync generator 14 is mounted above the roadway on an overhead support 15. It may be appreciated that existing overpasses above the roadway may be utilized to mount the camera 13. The television camera 13 is mounted so as to provide a field of view 16 encompassing a section of the roadway. The television camera 13 and the sync generator 14 may be conventional commercially procurable instruments that provide standard scanning raster of 525 lines at a rate of 60 frames per second. The sync generator 14 provides the required vertical and horizontal sync signals to the camera 13 in a conventional manner. The field of view may be arranged to provide a comprehensive picture of the traffic situation for the section of the roadway at which the camera is located. The camera 13 is mounted so that the lines of the scanning raster are substantially parallel with respect to the pattern 10. It is appreciated that the camera 13 may be adjustably mounted to the support 15 for remotely altering the field of view by pan, tilt, zoom or focus signals from the central control site of the system.

Vehicles traveling along the lane 11 may obscure portions of the pattern 10 from the view of the television camera 13 by interposition therebetween. The width of a vehicle covering the pattern 10 determines the number of portions thereof obscured from the camera. For example, the vehicle 17, when traversing the pattern 10, obscures 6 of the portions 12 and 12' from the view of the camera.

The television camera 13 provides, in a conventional manner a composite video signal, representative of the scanned field of view on a line 20. The signal on the line 20 comprises the video signals corresponding to the scanning lines of the raster as well as the standard vertical and horizontal sync pulses. The composite video signal on the line 20 is processed with respect to the video information signal provided by scanning the pattern 10 thereby determining data associated with the vehicular traffic on the roadway in a manner to be explained. The composite video signal on the line 20 is processed by the circuits illustrated in FIG. 2.

Referring now to FIG. 2, a lead 20' is coupled to receive the composite video signal from the line 20 of FIG. 1. The signal on the lead 20' is applied as an input to filter circuits 26. The filter circuits 26 may comprise high pass filtering networks that remove undesired low frequency variation from the composite video signal for reasons to be explained. The filter circuit 26 may also include amplifying circuits to increase the level of the filtered video signal to that required by the following circuit.

The filtered and amplified composite video signal from the filter circuits 26 is applied as an input to a bistable device 27. The bistable device 27 provides a first potential when the input signal thereto is in excess of a predetermined voltage and a second potential when the input signal is not in excess of the predetermined voltage. Thus, shaped video pulses are provided by the bistable device 27 in response to pulse information contained in the video signal. The bistable device 27 may comprise a conventional Schmitt trigger, or alternatively a conventional digital gate that provides a binary ONE or a binary ZERO output in accordance with the level of the input signal applied thereto.

The shaped video pulses provided by the bistable device 27 are applied as an input to a counter control logic circuit 28. The control logic circuit 28 also receives a Phase G signal on a lead 29 for reasons to be explained. The counter control logic circuit 28 provides a signal to a video pulse counter 30 enabling the counter to accumulate the shaped video pulses in accordance with the Phase G signal on the line 29.

A video reference pulse member source 31 provides signals representative of a number stored therein. The number is adjustable by means not shown. The video reference pulse number source 31 may comprise a plurality of conventional adjustable storage switches for providing the required signals. Alternatively, the circuit 31 may comprise digital register circuits for providing the required number.

The signals provided by the video reference pulse number source 31 are applied to a gating circuit 32. The gating circuit 32 also receives as an input a Phase F signal on a lead 33. The gating circuit 32 transfers the number stored in the circuit 31 into the video pulse counter 30 in response to the Phase F signal on the lead 33. Thus, the counter 30 may be pre-set to the video reference pulse number in response to the Phase F signal, for reasons to be explained.

The video pulse counter 30 may be a conventional reverse counter adapted to count backward from the preset video reference number in response to the shaped video pulses under control of the counter control logic circuit 28.

The output of the video pulse counter 30 is applied to a zero detector 36. The zero detector 36 provides a signal on its output lead 37 whenever the video pulse counter 30 attains a count of zero, for reasons to be explained.

The output of the zero detector 36 is applied as an input to a vehicle detect output storage circuit 38. The vehicle detect output storage circuit 38 also receives a phase H input signal on a lead 39. The phase H signal on the lead 39 strobes the binary state of the signal on the lead 37 into storage circuit 38, in a manner and for reasons to be discussed.

The output from the vehicle detect output storage circuit 38 is applied to a central control digital computer 40. The computer 40 may provide the central controlling function for the traffic control system in which the present invention is incorporated. The computer 40 is utilized to analyze the signals from the circuit 38, thereby providing the required traffic controlling signals.

The composite video signal provided by the camera 13 (FIG. 1) appearing on the lead 20' is applied as an input to a sync separator 41. The sync separator 41 removes the vertical and horizontal sync signals from the composite video signal, in a conventional manner, applying these signals to leads 42 and 43, respectively, for reasons to be explained.

The composite video signals on the lead 20' is also applied as an input to a summing network 46. The summing network 46 additionally receives, as an input, test signals on a lead 47 for reasons to be discussed. The summing network combines the test signals on the lead 47 with the composite video signal on the lead 20' providing the sum thereof on its output lead.

The output of the summing network 46 is applied as an input to a conventional television monitor 48. The monitor 48 displays the image of the composite video signals generated by the television camera 13 in accordance with the scene scanned. Adjustment and test patterns resulting from the test signals on the lead 47 may be superimposed on the monitor image for reasons to be explained.

The test signals on the lead 47 are provided by the wiper of a four position switch 49. A test 1 signal is applied to a contact 50 of the switch 49 from an AND gate 51. The shaped video pulses from the bistable device 27 and the phase G signal are applied as inputs to the AND gate 51 which in turn provides the conjunctive combination thereof to the contact 50 for reasons to be explained.

A test 2 signal applied to a contact 52 of the switch 49 is derived from the Phase G signal on the lead 29 for reasons to be discussed.

A test 3 signal is applied to a contact 53 of the switch 49 from an AND gate 54. The signal on the lead 37 from the ZERO detector 36 and the Phase H signal on the lead 39 are applied as inputs to the AND gate 54. The AND gate 54 provides the conjunctive combination of the applied input signals to the contact 53 for reasons to be explained.

The switch 49 has a fourth contact 57 utilized for normal operation of the device in a manner to be described.

The phase G control signal as well as the phase F and phase H signals are provided by control circuits 58. The control circuits 58 include a source of clock pulses 59. The source 59 provides clock pulse signals to a counter control logic circuit 60. The counter control logic circuit 60 also receives the vertical sync signal from the sync separator 41 as well as a signal from a zero detector 61 for reasons to be explained. The counter control logic circuit 60 in addition receives as inputs phase C, phase E, phase G and phase I signals for reasons to be discussed. The counter control logic circuit 60 provides input and control signals governing the operation of a sequencing counter 62 in a manner to be described.

The sequencing counter 62 may be a conventional binary counter of a type well known in the digital electronic circuits art. The vertical sync pulse on the line 42 is applied to the clear input of the counter 62 to reset the counter to its zero state. The outputs of the counter 62 are applied as inputs to a conventional decoder circuit 63. The decoder 63 provides the aforementioned phase A through phase I signals on the respective output leads thereof. The output leads of the decoder 63 are selectively energized in accordance with the respective states of the counter 62. The phase A through phase I signals are sequentially generated in accordance with the corresponding counts of the sequencing counter 62.

The phase F signal is coupled to the gating circuit 32; the phase G signal is coupled to the counter control logic circuit 28, to the AND gate 51 and to the switch 49; and the phase H signal is coupled to the vehicle detect output storage circuit 38 and to the AND gate 54 as previously described. The phase C, phase E, phase G and phase I signals are coupled to the counter control logic circuit 60 for reasons to be discussed.

Generally, the phase A through phase I signals are utilized to sequence the operations performed by the circuits of FIG. 2 in practicing the invention.

The control circuits 58 include line designation switches 64 for providing a preset number. The line designation switches 64 may comprise commercially procurable adjustable switches for providing digital signals in accordance with the preset number stored by reasons of the adjustment thereof. The line designation switches 64 may alternatively be embodied by conventional digital electronic registers. The number provided by the line designation switches 64 is representative of a predetermined scanning line of the raster of the television camera 13 (FIG. 1) in a manner to be described.

Similarly, lane start designation switches 67 and lane width designation switches 68 provide adjustable numbers representative of the beginning and end of a predetermined portion of the predetermined scanning line, respectively, in a manner to be explained.

The signals from the switches 64, 67 and 68 are applied as inputs to gating circuits 69, 70 and 71 respectively. The phase B, phase D and phase F signals from the decoder 63 are also applied as inputs to the respective gating circuits 69, 70 and 71. The gating circuits 69, 70 and 71 selectively transmit the numbers provided by the switches 64, 67 and 68 to a control counter 72 in response to the phase B, phase D and phase F signals, respectively. The control counter 72 may thus be selectively preset by a number representative of a predetermined line of the raster or by numbers representative of the beginning and end of a predetermined portion of the predetermined line in response to the phase B, phase D and phase F signals respectively.

The control counter 72 may be a conventional digital reverse counter of a type well known in the art of digital electronic circuits. The outputs of the counter 72 are applied as inputs to the zero detector 61 which provides a signal whenever the counter 72 attains the count of zero.

The operation of the counter 72 is controlled by a counter control logic circuit 73. The counter control logic circuit 73 has applied as inputs the output of the zero detector 61, the horizontal sync pulses from the sync separator 41 and the clock pulses from the clock pulse source 59 as well as the phase C, phase E and phase G signals from the decoder 63. The counter control logic circuit 73 governs the operation of the control counter 72 in accordance with the phase C, phase E and phase G signals in a manner to be described.

The operation of the aforedescribed embodiment of the present invention will be explained with reference to FIGS. 1 and 2. The field of view 16 is scanned by the television camera 13 in accordance with the standard 525 line raster at a rate of 60 frames per second. The resultant composite video signal comprising vertical and horizontal sync pulses as well as the video information signal is transmitted via lines 20 and 20' through the summing network 46 to the television monitor 48. If the switch 49 is in the normal position 57, the television monitor 48 provides a normal image of the scanned scene within the field of view 16.

The television camera 13 is mounted on the overhead support 15 so that the scanning lines of the raster are parallel to the pattern 10. It may thus be appreciated that particular portions of particular scanning lines of the raster will scan the pattern 10. One of the particular scanning lines that intersect the pattern 10 may be selected for deriving the data associated with the vehicular traffic on the lane 11 in accordance with the principles of the present invention.

Since the pattern 10 may comprise alternating white and black portions 12 and 12' respectively, the video signal corresponding to the portion of the scanning line that intersects the pattern 10 will comprise a series of pulses in accordance with the scanned contrasting portions 12 and 12'. When the pattern 10 is not obscured from the television camera 13 by a vehicle, the number of video pulses will correspond to the number of portions 12 and 12' comprising the pattern. However, if a vehicle such as the car 17 obscures a number of portions of the pattern in accordance with the width thereof, the number of video pulses that occur during the frames when the pattern is obscured will be diminished by the number of the obscured portions of the pattern.

The control circuits 58 function to select the scanning line as well as that portion thereof that scans the pattern 10. The test circuits associated with the switch 49 are utilized to adjust the switches 64, 67 and 68 so as to precisely select the appropriate portion of the scanning line in a manner to be explained.

The vertical sync pulse that occurs at the beginning of every video frame is removed from the composite video signal on the line 20' by the sync separator 41 and applied to the line 42. The vertical sync pulse is then utilized to clear the sequencing counter 62 to the zero state and decoder 63 enables the phase A line in response to the zero condition. In addition, the counter control logic circuit 60, in response to the vertical sync pulse, enables the sequencing counter 62 to commence counting clock pulses from the clock pulse source 59. The sequencing counter 62 thus advances to a count of one. When the one count is attained by the sequencing counter 62 the decoder energizes the phase B line. The phase B line enables the gating circuits 69 thereby presetting the control counter 72 with the number stored in the adjustable switches 64. As previously discussed, the number stored in the switches 64 is representative of a predetermined scanning line of the television raster. The next occurring clock pulse advances the sequencing counter 62 to the next count thereby causing the decoder 63 to energize the phase C line. The phase C signal disables the sequencing counter 62 via the counter control logic circuit 60 thereby preventing further advancement thereof.

The phase C signal is also effective to enable the control counter 72 via the counter control logic circuit 73 to count the horizontal sync pulses removed from the composite video signal by means of the sync separator 41. Since the control counter 72 is a reverse counter, as previously discussed, the counter 72 will count backward toward zero from the preset line designation number provided by the switches 64 in response to the sequentially occurring horizontal sync pulses. When the control counter 72 attains the count of zero the zero detector 61 disables the counter 72 via the counter control logic circuit 73. It may be appreciated that the switches 64 are adjusted so that the line designation number is such that the horizontal sync pulse that causes the counter 72 to attain the zero count is the horizontal sync pulse that initiates the predetermined scanning line of the raster. The predetermined scanning line is thus selected to scan the alternating pattern 10 on the lane 11, of the roadway.

The output of the zero detector 61 also enables the sequencing counter 62 via the counter control logic circuit 60 to again count clock pulses. The sequencing counter 62 thus a advances to the next higher count thereby enabling the phase D line via the decoder 63.

In a manner similar to that described with respect to the phase B operation, the phase D signal presets the control counter 72 with the number stored in the adjustable switches 67 which number is representative of the beginning of a predetermined portion of the predetermined scanning line as previously discussed. The sequencing counter 62 and the decoder 63 then advances in response to the next occurring clock pulse to enable the phase E line. The phase E signal disables the sequencing counter 62 in a manner similar to that described with respect to the phase C operation and, in addition, enables the control counter 72 via the counter control logic circuit 73 to commence counting clock pulses. When the zero detector 61 detects the zero state of the counter 72, the counter is disabled via the control counter logic circuit 73. It may be appreciated that the switches 67 are adjusted so that the number stored therein is such that the control counter 72 attains the zero count in response to the clock pulses when the predetermined scanning line is about to commence scanning the pattern 10 thereby defining the beginning of the predetermined portion of the predetermined scanning line as previously described.

The output of the zero detector 61 enables the sequencing counter 62 via the counter control logic circuit 60 to again count clock pulses. The counter 62 thus advances to the next higher state enabling the phase F line 33 via the decoder 63. In a manner similar to that described with respect to the phase B operation, the control counter 72 is preset to the number stored in the adjustable switches 68. The phase F signal also presets the video pulse counter 30 with the number stored in the switches 31 via the gating circuits 32. As previously discussed, the number stored in the switches 31 is representative of the number of alternating contrasting portions comprising the pattern 10. The sequencing counter 62 now advances in response to the next occurring clock pulse to enable the phase G line 29. The signal on the phase G line disables the sequencing counter 62 via the counter control logic circuit 60 from counting further clock pulses. The phase G signal also enables the control counter 72 via the counter control logic circuit 73 to commence counting the clock pulses. When the control counter 72 attains the zero state in response to counting the clock pulses, the zero detector 61 provides a signal disabling the control counter 72 via the counter control logic 73. As previously described, the switches 68 are adjusted so as to store a number such that the counter 72 attains the zero count in response to the clock pulses when the predetermined scanning line reaches the end of the pattern 10 after having scanned it. Thus the end of the predetermined portion of the predetermined scanning line is defined as previously described.

The zero detector 61 also enables the sequencing counter via the counter control logic circuit 60 to again commence counting clock pulses. The counter 62 thus advances to the next higher state thereby energizing the phase H line 39 and de-energizing the phase G line 29.

It may now be appreciated that the phase G signal comprises a control pulse occurring coincidentally with the scanning of the pattern 10 by the predetermined portion of the predetermined scanning line of the raster. During the occurrence of the phase G signal, the television camera 13 provides a sequence of video pulse signals on the line 20 corresponding to the scanning of the alternately contrasting portions 12 and 12' of the pattern 10. The pulsed video signal on the line 20 is transmitted to the line 20' and hence to the serially connected filter circuits 26 and bistable device 27. The filter circuits 26 and the bistable device 27 shape the incoming video pulses in a manner to be described.

It will now be appreciated that when the pattern 10 is unobstructed from view with respect to the television camera 13, the number of video pulses corresponds to the number of alternating portions of the pattern 10. When, however, a vehicle obscures portions of the pattern 10 from the television camera 13, the number of video pulses provided during the predetermined portion of the predetermined scanning line are diminished in accordance with the width of the obscuring vehicle.

During the occurrence of the phase G control pulse the video pulse counter 30 is enabled via the counter control logic circuit 28 to count the shaped video pulses. Since the counter 30 counts backward from a preset number representative of the number of contrasting portions comprising the pattern 10, the counter 30 should attain the zero count at the termination of the phase control pulse when the pattern 10 is not obscured by a vehicle. Should, however, the pattern 10 be partially obscured by a vehicle during the occurrence of the phase G control pulse, the counter 30 will register a non-zero count upon the termination of the control pulse. The non-zero count will be representative of the width of the vehicle obscuring the pattern 10. Thus at the termination of the phase G control pulse, the zero detector 36 provides a signal on the line 37 in accordance with whether or not the counter 30 has attained the zero state. Hence the signal on the line 37 is representative of the absence of a vehicle or the presence thereof during the phase G control interval of a video frame.

As previously described, when the zero detector 61 detects the zero count of the control counter 72 during the phase G interval, the control counter 72 is disabled via the counter control logic circuit 73 and the sequencing counter 62 is enabled via the counter control logic circuit 60 to again count clock pulses. The counter 62 thus advances to the next higher state enabling the phase H line 39 and disabling the phase G line 29. The phase H signal strobes the output of the zero detector 36 into the vehicle detect output storage 38.

The vehicle detect output storage 38 provides a binary output signal in accordance with the presence or absence of a vehicle as indicated by the state of the signal on the line 37.

The next occurring clock pulse applied to the counter control logic circuit 60 advances the sequencing counter 62 to the next higher state. The phase I line from the decoder 63 is thus enabled which in turn disables the sequencing counter 62 via the counter control logic circuit 60 from counting further clock pulses. The system remains in the phase I interval until the next occurring video frame at which time the vertical sync pulse reinitiates the sequence of operations hereinabove described.

It may be appreciated that several video frames may occur while a vehicle is traversing the pattern 10. Thus the phase H signal associated with each of the frames will strobe a signal representative of vehicle presence into the vehicle detect output storage 38. The vehicle detect output storage 38 thus provides a continuous presence signal while a vehicle is obscuring the pattern 10 or a continuous absence signal when the pattern 10 is unobscured. Hence the vehicle detect output storage 38 provides a pulse for each vehicle traversing the pattern 10 whose pulse width is a function of the vehicle length and velocity. These pulses are transmitted to the central control computer 40 of the traffic control system to provide a count of the vehicles traversing the roadway under surveillance by the television camera 13. The count data signal may then be utilized by the computer 40 in effectuating control of the traffic.

As previously mentioned, the filter circuits 26 and the bistable device 27 shape the video pulses for proper operation of the video pulse counter 30. It may be appreciated that variations in shading across the lane 11 of the roadway may cause low frequency variations of the d.c. level of the video pulses which may result in improper operation of the counter 30. In addition, the standard d.c. level that exists between the video information signals and the sync signals may prevent the counter 30 from functioning properly. The filter circuits 26 may comprise high-pass filters for removing these undesired d.c. levels and low frequency variations. The bistable device 27 provides a binary signal in accordance with the magnitude of the video pulses from the filter circuits 26, hence providing the shaped video pulses previously discussed. It may be appreciated that amplifying circuits may be included in the filter circuits 26 to increase the level of the video signals to that required by the bistable device 27.

As previously discussed, when the switch 49 is in the normal position 57, the composite video signal from the television camera 13 is applied to the monitor 48 via the summing network 46. The monitor 48 thus displays an image of the roadway scanned by the camera 13. In order to properly adjust the switches 64, 67 and 68 and to verify the proper operation of the system, the test positions 50, 52 and 53 of the switch 49 may be utilized, with the switch 49 in the position 52, the phase G control signal is added to the composite video signal by the summing network 46 thereby intensifying the image on the monitor 48 during the occurrence of the predetermined portion of the predetermined scanning line. Thus a bright line corresponding to the occurrence of this predetermined portion of the raster will be superimposed on the normal image of the scanned scene. By adjusting the line designation switches 64, the bright test line may be moved from one scanning line of the raster to another. The switches 64 may thus be adjusted so that the predetermined portion of the predetermined scanning line coincides with the longitudinal center line of the pattern 10. The lane start designation switches 67 and the lane width designation switches 68 may then be similarly adjusted so that the predetermined portion of the predetermined scanning line occurs precisely in coincidence with the pattern 10.

In the operation of the present invention it may be necessary to adjust the d.c. level of the video signal provided by the camera 13 (by means not shown) so that the circuits associated with the bistable device 27 will operate properly to provide the shaped video pulses corresponding to the contrasting portions of the pattern 10. The position 50 of the switch 49 may be utilized for this purpose. The AND gate 51 provides the conjunctive combination of the shaped video pulses and phase G control signal to the contact 50. The conjunctive combination signal is added to the composite video signal by the summing network 46 to intensify the image on the monitor 48 for the purpose of making the adjustment. With the switch 49 in the test position 50 a sequence of bright dashes will appear superimposed over the pattern 10 coincident with the portions 12 of the pattern. The test dashes may alternatively appear in coincidence with the portions 12' depending on the test circuits utilized. The aforementioned d.c. level may be adjusted to provide a clearly defined sequence of dashes. If the d.c. level is not properly adjusted the pattern of dashes will be indistinct.

The test position 53 of the switch 49 may be utilized to verify the proper operation of the system. The test circuits may be arranged so that in the absence of a vehicle a bright dash will appear adjacent the image of the test pattern 10 when the system is operating properly. Any factor that causes the video pulse counter 30 to exhibit a non-zero count at the termination of the phase G control signal will result in the absence of test dashes from the image on the monitor 48. For example, should a section of the pattern 10 become damaged, thus resulting in false counts with respect to the number stored in the video reference pulse number switches 31, the test dash would not appear on the monitor. This condition may be remedied by re-adjustment of the switches 31 or readjustment of the phase G control signal with respect to the pattern 10 by adjusting of the switches 64, 67 and 68 by means of the test positions of the switch 49.

It may be appreciated that the circuits illustrated in FIG. 2 may be located at the central site of the control system with the composite video signals on the line 20 being transmitted thereto by any convenient means for application to the lead 20'. Alternatively, the circuits of FIG. 2 may be located at the surveillance site of the television camera 13 and the vehicle detect output from the vehicle detect output storage 38 may be transmitted to the central site for application to the central control computer 40. This latter arrangement may be desirable if monitoring of the television image is not required.

It may further be appreciated that the television camera 13 may also provide data with respect to a lane 11' by providing thereon a pattern 10' similar to the pattern 10 previously discussed. The system may utilize the pattern 10' by incorporating additional phases in the sequence of operations previously described and utilizing additional circuits similar to those described with respect to FIG. 2.

While the system has been described in terms of determining vehicle presence and count, vehicle width may also be determined by examining the residual count in the counter 30 at the termination of the phase G control pulse.

It may further be appreciated that vehicle velocity may readily be obtained by the system of the present invention by disposing another pattern on the surface of the lane 11 identical to the pattern 10 and positioned parallel thereto. The second pattern is positioned a short distance down the roadway from the pattern 10 within the field of view of the television camera 13. Additionally, circuits similar to those described with respect to FIG. 2, including a vehicle detect output storage circuit associated with the second pattern would be provided. Thus, as previously described, a vehicle traversing the pattern 10 causes the vehicle detect output storage circuit 38 to generate a pulse whose width is representative of the velocity and length of the vehicle. The vehicle then traverses the second pattern down the roadway causing the associated vehicle detect output storage circuit to generate a second pulse whose width is again representative of the vehicle velocity and length. The time displacement between the pulse associated with the pattern 10 and the pulse associated with the second pattern is a function of the vehicle velocity. The central control computer 40 may be utilized to analyze the pulses to provide this data. After the velocity is determined the vehicle length may then be computed by an examination of the pulse width.

It may further be appreciated that parameters such as lane occupancy and queue length may be computed by the central control computer 40 when utilizing the embodiment of the present invention illustrated in FIG. 1 and 2.

It may furthermore be appreciated that the aforementioned parameters may alternatively be computed from the pulses provided by the vehicle detect output storage circuits by utilizing apparatus of the type disclosed in U.S. Pat. No. 3,406,395 entitled, "Vehicle Characteristic Sensing and Measuring Apparatus for Vehicular Traffic Control" by J.E. Zupanick, issued Oct. 15, 1968, and assigned to the assignee of the present invention.

Figure 3:
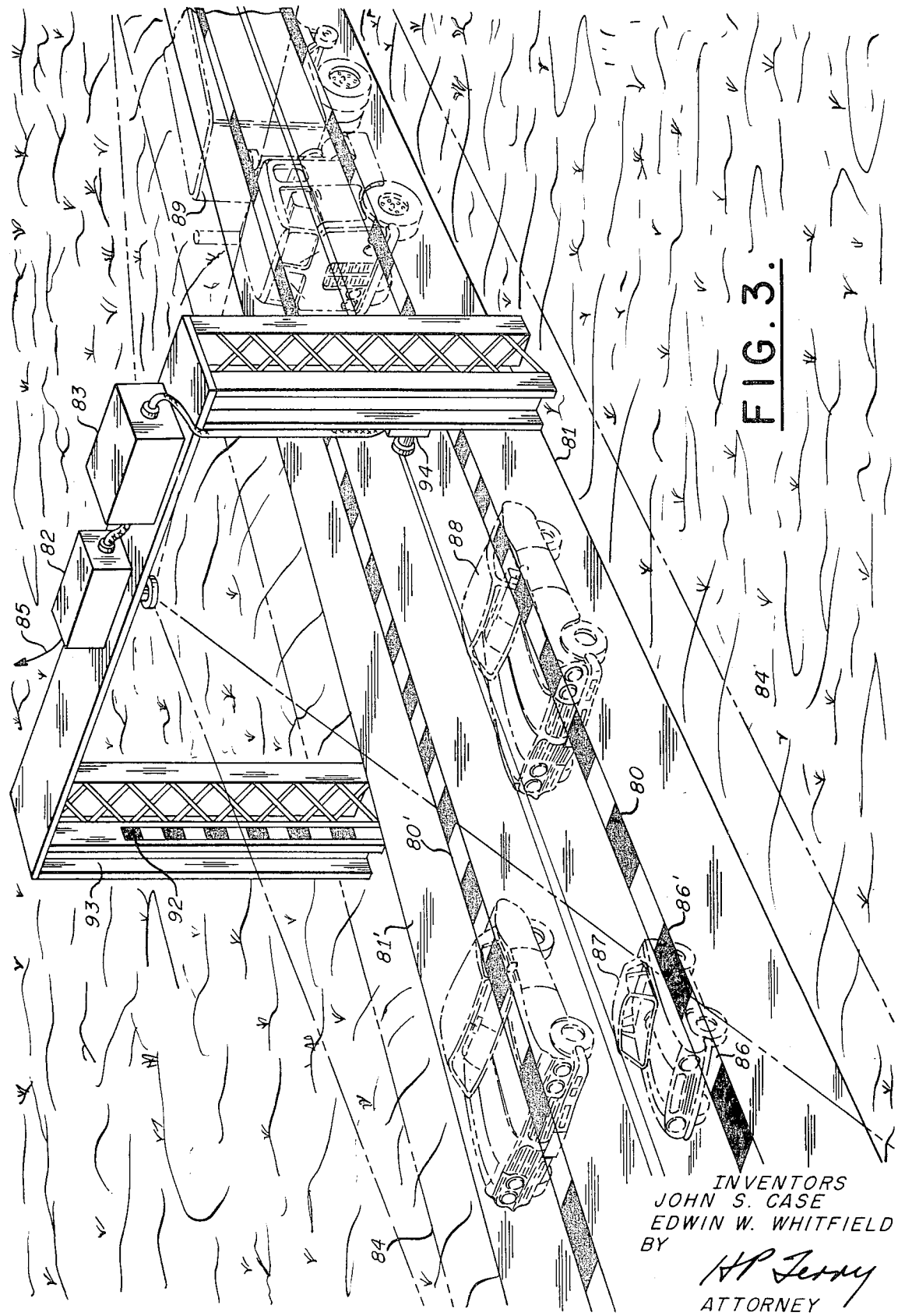
FIG. 3. is a perspective view of a roadway adapted for utilizing another embodiment of the invention.

Referring now to FIG. 3, a portion of two lanes of a roadway adapted for utilizing another embodiment of the present invention is illustrated.

An alternating pattern 80 is disposed on the surface of a lane 81 in a manner similar to that described with respect to FIG. 1 except that the pattern is disposed longitudinally along the center line of the lane 81. A television camera 82 with an associated sync generator 83 is mounted to view the roadway in a manner similar to that described with respect to FIG. 1, except that the camera 82 is oriented so that the scanning lines of the raster are substantially parallel to the pattern 80. The television camera 82 scans a field of view 84 providing a composite video signal on a line 85 in a manner similar to that described with respect to FIG. 1. The composite video signal on the line 85 is processed by the circuits illustrated in FIG. 4.

Referring now to FIG. 4, a lead 85' is coupled to receive the composite video signal from the line 85 of FIG. 3. The signal on the lead 85' is applied as an input to filter circuits 100 which, in turn, is coupled to a bistable device 101. The filter circuits 100 and the bistable device 101 may be similar to the corresponding circuits 26 and 27 described with respect to FIG. 2, the bistable device 101 providing shaped video pulses in a manner similar to that described with respect thereto.

The shaped video pulses are applied as an input to a gating circuit 102. The gating circuit 102 transmits the shaped video pulses to a buffer register 103 under the control of a phase G signal provided by control circuits 104, in a manner and for reasons to be explained. The control circuits 104 also provide a phase F signal to the clear input of the buffer register 103 for reasons to be discussed. It may be appreciated that the control circuits 104 are structurally and functionally similar to the control circuits 58 of FIG. 2.

The buffer register 103 provides a data signal to a central control computer 105 and the central control computer 105 provides a control signal to the buffer register 103 for reasons to be discussed.

A sync separator 106 is coupled to receive the composite video signal on the line 85' and provides the vertical and horizontal sync signals to the control circuits 104 in the manner and for reasons previously discussed with respect to FIG. 2.

Test and adjust circuits 107 are structurally and functionally identical to the components 49, 50, 51, 52, and 57 of FIG. 2, and a description thereof will not be repeated for brevity.

A summing network 110 is coupled to receive the composite video signal on the lead 85' providing the composite video signals to a monitor 11 in a manner similar to that described with respect to FIG. 2.

The operation of the embodiment of the present invention illustrated by FIGS. 3 and 4 is similar to the operation of the embodiment of the invention illustrated with respect to FIGS. 1 and 2. The phase G control signal is adjusted by the control circuits 104 to coincide with the predetermined portion of the predetermined scanning line that scans the pattern 80. It may be appreciated that because of the geometrical arrangement of the pattern 80 with respect to the television camera 82, the predetermined portion of the predetermined scanning line may be substantially longer than the predetermined portion of the scanning line of the previously described embodiment of the invention. In fact, in the embodiment illustrated in FIGS. 3 and 4, the predetermined portion may comprise the entire scanning line.

During each video frame generated by the television camera 82, the phase F signal from the control circuits 104 is utilized to clear the buffer register 103. The subsequently following phase G control pulse enables the gate 102 to transmit the shaped video pulses that result from scanning the pattern 80 into the buffer register 103.

Subsequent to the phase G signal and prior to the next occurring video frame, the central control computer 105 may provide a signal to the buffer register 103 to control the transfer of the binary word stored therein to the computer input. The bits of the word may be transferred serially or in parallel in accordance with the design of the system.

It may be appreciated that the binary word stored in the buffer register 103 has a number of bits equal to the number of alternating portions of the pattern 80 scanned by the predetermined portion of the predetermined scanning line. A binary word is shifted into the register 103 for each occurring video frame. The bit pattern of a binary word is representative of the instantaneous traffic situation along the lane 81 within the field of view 84 of the camera 82. Corresponding to the sequentially occurring frames of video, a sequence of binary words is transmitted to the computer 105, each word representative of an instantaneous traffic configuration and the sequence of words representative of the incremental changes in the traffic configuration. The traffic situation within the field of view 84 is thus resolved with respect to time in accordance with the frame rate which may be one-sixtieth of a second.

As an example, vehicles 87, 88 and 89 may be traversing the lane 81 at a particular instance in time. Scanning of the pattern 80, which is partially obscured by the vehicles, provides a binary number to the control computer 105 with a bit pattern representative of the instantaneous positions of the vehicles. The next occurring video frame provides a binary word whose bit pattern is representative of the incrementally altered positions of the vehicles 87, 88 and 89 with respect to the previously occurring frame.

It may thus be appreciated that the sequence of binary words transferred into the computer 105 via the buffer register 103 may be analyzed therein to provided data such as vehicle presence and count, vehicle velocity, vehicle length, lane occupancy, vehicle spacing and queue length. As an example, the different lengths of the sedans 87 and 88 as well as the length of the truck 89 may be determined for statistical purposes, by programming the computer 105, in a conventional manner, to determine, for example, the number of consecutive binary ONES or binary ZEROS in the words thereby providing data representative of the lengths of the vehicles.

It may be appreciated that a second pattern 80', identical to the pattern 80, may be disposed on a lane 81' adjacent the lane 81. Additional electronic circuits may be included in FIG. 4 to provide control signals with respect to the scanning of the pattern 80' by the television camera 82 and to analyze the data provided thereby. The signals generated by scanning the pattern 80' may provide similar data with respect to the lane 81' as provided by the pattern 80 on the lane 81 as previously discussed.

In addition, the central control computer 105 may analyze the respective binary words provided by scanning the patterns 80 and 80' to determine interlane crossings of vehicles.

It may further be appreciated that although the present invention is described in terms of patterns disposed on the surfaces of a roadway, an alternating pattern 92 may be arranged vertically with respect to the roadway by disposing the pattern 92, for example, on one of the upright members 93 of the overhead support. A television camera 94 may be mounted on the opposite upright member of the overhead support to scan the pattern 92 in a manner similar to that previously described with respect to the television camera 82 and the pattern 80. The sync generator 83 may provide the required sync signals to the camera 94. Alternatively, the pattern 92 may be disposed on a vertical pole at the side of the roadway and the camera 94 may be positioned at the opposite side of the roadway for scanning the pattern. It is understood that the pattern 92 may be obscured from the view of the camera 94 by the vehicles traveling along the roadway. The desired data associated with the vehicles may be derived by apparatus and in a manner similar to that described with respect to FIG. 2. It is appreciated that the pattern 92 and the television camera 94 may, in addition, provide the heights of the vehicles traversing the roadway in a manner similar to the width determination described with respect to FIG. 2. An embodiment of the present invention wherein the alternating pattern is vertically disposed with respect to the roadway might be advantageously utilized in situations where the patterns on the roadways are readily obscured by undesired coverings such as mud or snow.

It may now be appreciated that a combination of the aforedescribed embodiments disclosed with respect to FIGS. 1–4 may be realized for determining the length, width and height of vehicles traversing the surveillance site by utilizing three patterns orthogonally oriented with respect to each other and three suitably disposed television cameras, respectively. This dimensional data may be derived by apparatus and in a manner similar to that previously described. The data may be utilized, for example, for statistical purposes or for reasons of safety with respect to the heights of trucks, for example, relative to the heights of overpasses traversing the roadway.

A further embodiment of the present invention might be utilized under nighttime conditions wherein a pattern located at the side of the roadway may be obscured by the shadows cast by the vehicles in accordance with a light source suitably positioned with respect to the roadway. Alternatively, a light source may be positioned to illuminate the patterns on the roadway and may be automatically energized when the ambient light is below a predetermined level. The light source may be actuated by apparatus of the type disclosed in U.S. Pat. No. 3,445,634 entitled, "Correlation Identification Apparatus" by A. Lanes et al, issued May 20, 1969, and assigned to the assignee of the present invention. As a further alternative, the patterns may be constructed of light transmissive material which may be illuminated from beneath the surface of the roadway by recessed light sources automatically actuated in a manner similar to that described above.

It will now be appreciated from the foregoing descriptions of the preferred embodiments of the present invention that television surveillance cameras positioned to monitor the traffic situation may provide all of the data required by a traffic actuated computer controlled system. Because of the rapidly recurring frame rate and the excellent spatial resolution of standard television equipment, highly accurate data at a high data rate may be provided for the control system. Additionally because of the precisely demarcated field of view of the television camera, precisely defined measurement zones are defined.

It is further appreciated that as well as providing the required traffic data, the closed-circuit television system utilized in the above described embodiments of the invention also provides conventional surveillance capabilities. As a consequence, the accuracy of the data provided by the television camera sensor of the present invention may be readily checked at the central control site of the system by comparing the derived data to the visual images provided on the television monitors.

It may also be appreciated that the signals provided by the sensor of the present invention are in a form suitable for use by the central control computer of the system. Thus the computer may automatically generate signals for the efficacious regulation of the traffic in the controlled zone in accordance with the changing traffic situation.

It may further be appreciated that the sensor of the present invention is less susceptible to providing false indications of vehicles than prior art sensors such as the magnetic loop detector previously discussed since the television camera is not critically affected by disturbing influences such as electrical storms.

While the above described embodiments of the present invention were explained in terms of black and white patterns, it may be appreciated that patterns of contrasting colors may be used in a system utilizing color television equipment. In such a system the color separation inherent in the television camera circuits and the separately available video signals corresponding to the colors may provide an enhanced data capability with respect to the previously described system.

Although the aforedescribed embodiments of the invention were illustrated with the television cameras providing views of a roadway, it may be appreciated that the cameras may be positioned at other locations, such as at intersections within the zone under control of the system. As well as determining data with respect to vehicles, the present invention may also provide data with respect to the pedestrians in a traffic situation.

It may further be appreciated that although the sync generators have been illustrated proximate to the television cameras for convenience, the sync generators may alternatively be located at the central site of the traffic control system if desired.

While the previously discussed embodiments of the present invention have been described in terms of determining data associated with vehicles, it may be appreciated that the principles of the present invention are applicable for the determination of data associated with other objects such as, for example, objects on a conveyor belt. Data such as object count may be determined by utilizing the teachings of the present invention hereinabove discussed. It may be appreciated that the length, width and height of the objects may also be determined by utilizing an embodiment of the present invention incorporating three patterns orthogonally oriented with respect to each other in a manner similar to that previously described with respect to FIGS. 1–4. It may furthermore be appreciated that scanning devices other than television cameras may be utilized in practicing the present invention.

While the invention has been described in its preferred embodiments, it is to be understood that the words which have been used are words of description rather than limitation and that changes may be made within the purview of the appended claims without departing from the true scope and spirit of the invention in its broader aspects.

1. A system for determining data associated with objects comprising pattern means comprising alternating contrasting portions, means for scanning said pattern means, said pattern means being disposed with respect to said scanning means for at least partial effective obscuration from said scanning means by said objects, said pattern means not being interposed between said scanning means and said objects, said scanning means providing pulses corresponding to the scanned alternating portions of said pattern means not effectively obscured therefrom by said objects, and means for processing said pulses to determine said data.

2. The system of claim 1 in which said pattern means comprises said contrasting portions adjacent each other, said scanning means comprises television camera means, said objects are effective to obscure some of said portions of said pattern means from said television camera means, and said pulses comprise video pulses provided by said television camera means corresponding to the scanned portions of said pattern means not effectively obscured therefrom by said objects.

3. A system for determining data associated with vehicles on a roadway comprising, pattern means having a longitudinal dimension and comprising colinearly arranged contrasting portions adjacent each other, television camera means disposed with respect to said roadway for scanning said pattern means in accordance with a raster the scanning lines of which are substantially parallel to said longitudinal dimension of said pattern means, said vehicles being effective to obscure some of said portions of said pattern means from said television camera means, said television camera means providing video pulses corresponding to the scanned portions of said pattern means not effectively obscured therefrom by said vehicles, and means for processing said video pulses to determine said data.

4. The system of claim 3 including said pattern means being disposed on the surface of said roadway, and said television camera means being disposed above said roadway, said vehicles on said roadway obscuring some of said portions of said pattern means from said television camera means by interposition therebetween.

5. The system of claim 3 in which said processing means comprises first counting means for counting said pulses to provide signals representative of said data.

6. The system of claim 5 further including control means for providing a control signal coincident with the occurrence of said scanning of said pattern means by said television camera means in accordance with a predetermined portion of a predetermined scanning line of said raster, and first logic means responsive to said control signal and the video signal from said television camera means for enabling said first counting means to count said video pulses in response to said control signal.

7. The system of claim 6 in which said television camera means provides vertical and horizontal sync pulses and in which said control means includes first timing means responsive to said vertical sync pulse from said television camera means for providing a first signal representative of the beginning of said predetermined scanning line, second timing means responsive to said first signal for providing a second signal representative of the beginning of said predetermined portion of said predetermined scanning line, and third timing means responsive to said second signal for providing a third signal representative of the end of said predetermined portion of said predetermined scanning line, said second and third signals defining said control signal.

8. The system of claim 7 in which said first, second and third timing means comprise first, second and third adjustable storage means for storing respectively first, second and third numbers representative of said predetermined scanning line, said beginning of said predetermined portion and said end of said predetermined portion respectively, control counter means for providing said first, second and third signals, first, second and third gating means coupled between said first, second and third storage means respectively and said control counter means for sequentially gating said first, second and third numbers thereto, a source of clock pulses, and second logic means coupled to receive said clock pulses and said horizontal sync pulses from said television camera means for selectively enabling said control counter means to count said horizontal sync pulses for comparison with said first number thereby providing said first signal and to count said clock pulses for comparison with said second and third numbers thereby providing said second and third signals respectively.

9. The system of claim 8 in which said control means further includes sequencing counter means coupled to receive said vertical sync pulse for providing a sequence of timing signals in response thereto, said timing signals being applied to said first, second and third gating means and to said second logic means for controlling the operations thereof.

10. The system of claim 6 including said pattern means being disposed on the surface of said roadway transversely thereto, and said television camera means being disposed above said roadway, said vehicles on said roadway obscuring portions of said pattern means from said television camera means by interposition therebetween.

11. The system of claim 10 further including fourth adjustable storage means for storing a fourth number representative of the number of said portions comprising said pattern means, and fourth gating means coupled between said fourth storage means and said first counting means for gating said fourth number thereto, said first logic means enabling said first counting means to count said video pulses for comparison with said fourth number thereby providing said signals representative of said data.

12. The system of claim 6 further including
filtering means coupled to receive said video signal for filtering undesired low frequency variations therefrom to provide a filtered video signal, and
bistable means coupled to receive said filtered video signal for providing a first potential when said filtered video signal is in excess of a predetermined voltage and a second potential when said filtered video signal is not in excess of said predetermined voltage thereby generating said video pulses, 13. The system of claim 6 further including
AND gate means coupled to receive said video pulses and said control signal for providing a signal representative of the logical conjunction thereof, and
means coupled to receive said conjunction signal and said video signal for combining said conjunction signal with said video signal thereby providing a video signal intensified in accordance with said video pulses during the occurrence of said predetermined portion of said predetermined scanning line of said raster.

14. The system of claim 6 further including means coupled to receive said control signal and said video signal for combining said control signal with said video signal thereby providing a video signal intensified during the occurrence of said predetermined portion of said predetermined scanning line of said raster.

15. The system of claim 3 in which said portions of said pattern means comprise alternate black and white rectangles respectively, contiguously arranged with respect to each other.

16. The system of claim 3 further including television monitor means coupled to receive the video signal from said television camera means for displaying the scene scanned thereby.

17. The system of claim 3 in which
said video pulses define digital numbers, and
said processing means comprises computer means for analyzing said numbers to determine said data.

18. The system of claim 17 including
said alternating pattern means being disposed on the surface of said roadway longitudinally with respect thereto, and
said television camera means being disposed above said roadway,
said vehicles on said roadway obscuring some of said portions of said pattern means from said television camera means by interposition therebetween.

19. The system of claim 18 further including
control means for providing a control signal coincident with the occurrence of said scanning of said pattern means by said television camera means in accordance with a predetermined scanning line of said raster, and
gating means responsive to said control signal and the video signal from said television camera means for transmitting said video pulses to said computer means in response to said control signal.

20. A system for determining the dimensions of objects comprising
a plurality of pattern means orthogonally disposed with respect to each other,
each said pattern means comprising alternating contrasting portions,
a plurality of means for scanning said pattern means respectively,
said plurality of pattern means being disposed relative to said plurality of scanning means for partial obscuration from said plurality of scanning means by said objects by interposition of said objects between said pattern means and said scanning means, respectively,
each said scanning means providing pulses corresponding to the scanned alternating portions of said respective pattern means not obscured therefrom by said objects, and
means for processing said pulses to determine said dimensions.

21. The system of claim 20 in which
each said pattern means comprises said contrasting portions adjacent each other, and
said processing means comprises a plurality of counting means for counting said pulses from said plurality of scanning means respectively to provide signals representative of said dimensions.

22. Apparatus for use in a system for determining data associated with objects including television camera means for scanning pattern means comprising alternating contrasting portions, said camera means providing a video signal and vertical and horizontal sync pulses, said pattern means being disposed with respect to said camera means for at least partial effective obscuration therefrom by said objects, said apparatus comprising in combination:
control means responsive to said horizontal and vertical sync pulses from said television camera means for providing a control signal coincident with the occurrence of said scanning of said pattern means by said television camera means in accordance with a predetermined portion of a predetermined scanning line of the raster of said television camera means,
means for processing said video signal from said television camera means, and
first logic means responsive to said control signal and to said video signal for enabling said processing means to process said video signal in accordance with said control signal to provide signals representative of said data.

23. The apparatus of claim 22 in which said control means includes
first timing means responsive to said vertical sync pulse for providing a first signal representative of the beginning of said predetermined scanning line,
second timing means responsive to said first signal for providing a second signal representative of the beginning of said predetermined portion of said predetermined scanning line, and
third timing means responsive to said second signal for providing a third signal representative of the end of said predetermined portion of said predetermined scanning line,
said second and third signals defining said control signal.

24. The apparatus of claim 23 in which said first, second and third timing means comprise first, second and third adjustable storage means for storing respectively first, second and third numbers representative of said predetermined scanning line, said beginning of said predetermined portion and said end of said predetermined portion respectively, control counter means for providing said first, second and third signals, first, second and third gating means coupled between said first, second and third storage means respectively and said control counter means for sequentially gating said first, second and third numbers thereto, a source of clock pulses, and second logic means coupled to receive said clock pulses and said horizontal sync pulses for selectively enabling said control counter means to count said horizontal sync pulses for comparison with said first number thereby providing said first signal and to count said clock pulses for comparison with said second and third numbers thereby providing said second and third signals respectively.

25. The apparatus of claim 24 in which said control means further includes sequencing counter means coupled to receive said vertical sync pulse for providing a sequence of timing signals in response thereto, said timing signals being applied to said first, second and third gating means and to said second logic means for controlling the operations thereof.

26. The apparatus of claim 25 in which said pattern means comprises said contrasting portions adjacent each other, said television camera means provides video pulses corresponding to the scanned portions of said pattern means not effectively obscured therefrom by said objects, and said processing means comprises first counting means for counting said pulses to provide signals representative of said data, said first logic means enabling said first counting means to count said video pulses in response to said control signal.

27. The apparatus of claim 26 further including fourth adjustable storage means for storing a fourth number representative of the number of said portions comprising said pattern means, and fourth gating means coupled between said fourth storage means and said first counting means for gating said fourth number thereto, said first logic means enabling said first counting means to count said video pulses for comparison with said fourth number thereby providing said signals representative of said data.

* * * * *